March 3, 1931. R. M. KERSCHNER 1,794,520
INSULATOR RACK
Filed Feb. 24, 1928
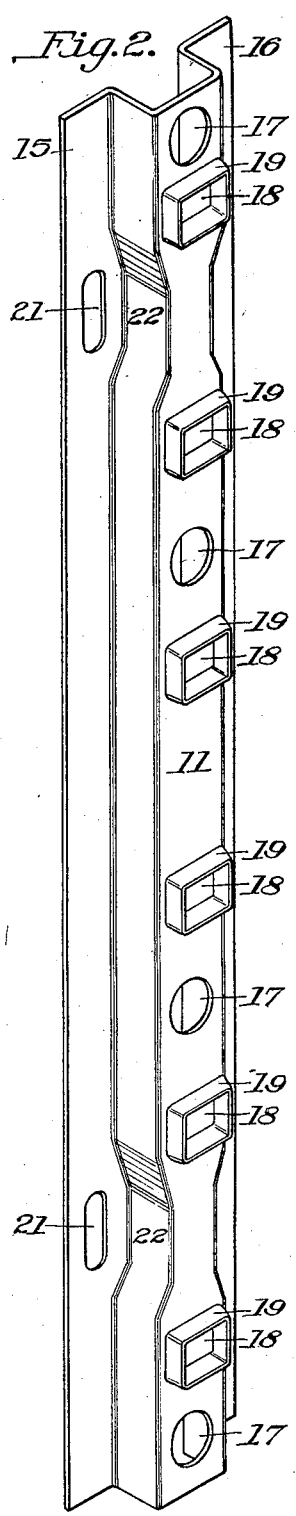
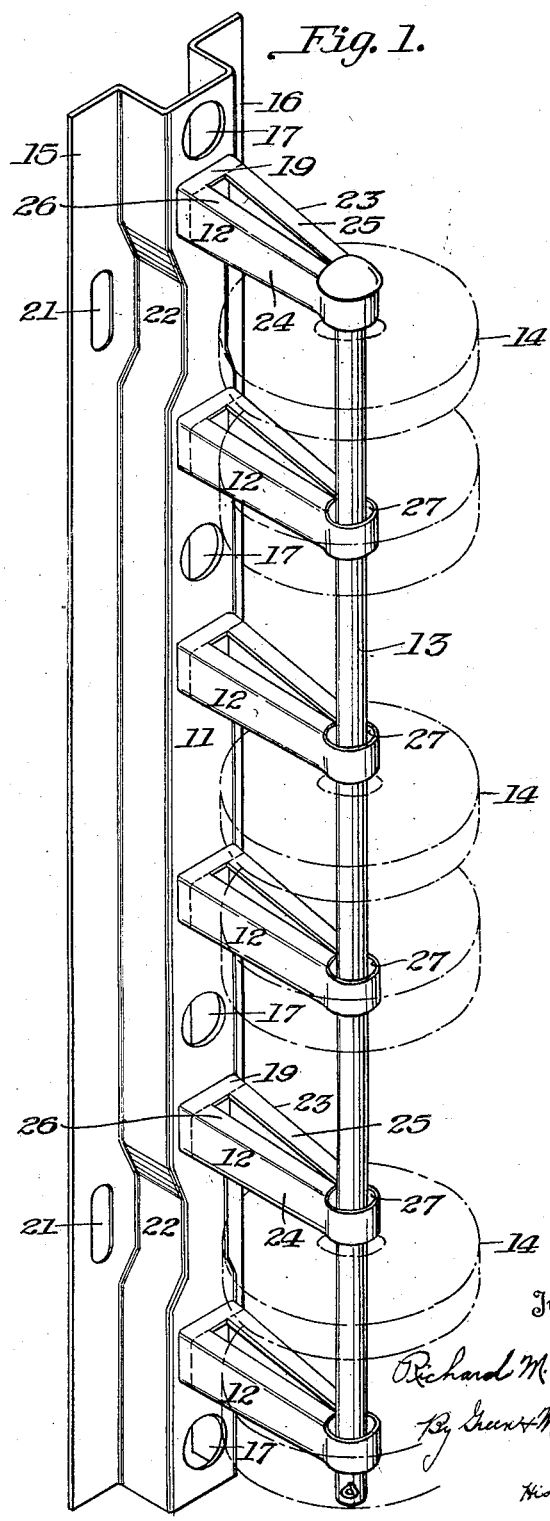

Patented Mar. 3, 1931

1,794,520

UNITED STATES PATENT OFFICE

RICHARD M. KERSCHNER, OF PITTSBURGH, PENNSYLVANIA, ASSIGNOR TO HUBBARD & COMPANY, A CORPORATION OF PENNSYLVANIA

INSULATOR RACK

Application filed February 24, 1928. Serial No. 256,577.

This invention relates to insulator racks and more particularly to a method of making the same.

Insulator racks generally comprise a base member having insulator pin supports fixed thereto. The methods that have heretofore been employed for making insulator racks, such as lap-welding or riveting the pin supports to the base, are undesirable in view of the pickling and galvanizing processes to which such racks are subjected, causing weeping joints where the pin supports are fixed to the base. During the pickling and galvanizing processes, the acid of the pickling process penetrates between the riveting joints at many points where it is impossible for the galvanizing metal to penetrate, this causes corrosion and weakening of the joints, also it is very difficult to obtain a complete lap-weld to the extent that the adjacent surfaces are free from cracks or openings between the joints, this causes the same result as the riveting joints. Lap-welding is further undesirable in view of the base radiating the welding heat so rapidly that the welding process is retarded.

An object of this invention is to provide a metal insulator rack base having integral projections at the points where it is desired to weld the pin supports that shall prevent the necessity of applying the welding heat to the main base portion.

Another object of this invention is to provide a method of making insulator racks that shall be so constructed as to reduce the radiation of welding heat applied thereto and thereby render the method of welding pin supports to the base member more efficient and expedient.

Another object of this invention is to provide a method of making insulator racks that shall be simple in structure, inexpensive to manufacture and adapted for use wherever an insulator rack may be required.

Other objects lie in the novel construction and combination of parts that will be made apparent throughout the further description of the device illustrated in the accompanying drawings and set forth in the appended claims.

In the drawings:

Fig. 1 is a perspective view of an insulator rack constructed in accordance with the present method, and Fig. 2 is a similar view to Fig. 1 having the insulator pin and pin supports removed.

The insulator rack illustrated in order to disclose the present method, consists of a base member 11 having pin supports 12 welded thereto in spaced relation and an insulator pin 13 having insulators 14 disposed thereon.

The present method consists in stamping from a piece of sheet metal, a base 11 (see Fig. 2). This base 11 is formed by a single stamping into the shape of a channel having its sides terminating in outwardly extending flanges 15 and 16, simultaneously with the forming of the sheet metal base. The channel portion is punched to provide a plurality of spaced openings 17 and a plurality of spaced openings 18, the openings 18 having annular flange like struck-up portions 19 integral with the edges thereof and the flange portions 15 and 16 are provided with spaced elongated openings 21.

Either of the openings 17 or 21 may be employed with suitable means such as clamping bolts and nuts for fastening the rack to a wall, roof or the like. The channel portion adjacent the openings 21 is curved inwardly, as shown at 22, for permitting free access to such clamping means as may be employed with the openings 21.

The openings 18 having annular flange like struck-up portions 19, are a very important feature of this invention and will hereinafter be described in connection with the pin supports 12.

The pin supports 12 are also preferably stamped from sheet metal and bent upon themselves, forming two legs 23 and 24 having their ends ending adjacent, one to the other. The sides of the legs 23 and 24 are provided with inwardly turned flanges 25 and 26. The ends of these flanges 25 and 26, together with the ends of the main portions of the legs are adapted to conform with and rest upon the struck-up portions 19, at which time the pin supports 12 may be welded to the struck-up portions 19.

The pin supports are so formed at their tops as to provide a cylindrical opening 27 for receiving the insulator pin 13.

I have found through practice, that in providing the struck-up portions 19 and welding the pin supports 21 to such struck-up portions, instead of welding the pin supports 12 directly to the base 11, that the radiation of the welding heat is considerably lessened so much so that a more efficient weld is obtained and much time is saved in the operation.

It can be seen from the above that the struck-up portions 19 limit the radiating surface of the metal base 11, whereas, as has been the practice heretofore, to weld the pin supports directly to the base 11, that it is necessary to apply the welding heat directly to the base which conducts the head from the point desired very rapidly so much so that in many instances a proper weld is not obtained and much time is lost in the operation.

While I have illustrated and described this invention in connection with a base member having struck-up portions for welding pin supports thereto, it will be apparent to those skilled in the art that certain changes, modifications, substitutions, additions and omissions may be made in the invention without departing from the spirit and scope of the appended claims.

What I claim as new and desire to secure by Letters Patent is:

1. As a new article of manufacture, an insulator rack having a channel base with its sides terminating in outwardly extending flanges, spaced elongated openings in the said flanges, an incurved portion in the channel portion adjacent the said elongated openings and spaced pin supports welded to the said channel portion.

2. As a new article of manufacture, an insulator rack having a channel shaped base member, a plurality of spaced openings therein and a plurality of rectangular openings therein, the said rectangular openings having integral up-standing continuous flanges adjacent the edges thereof and a pin support bent upon itself so as to position its ends adjacent, one to the other, the ends of the said pin support being welded to the said up-standing flange.

In testimony whereof, I have hereunto subscribed my name this 15th day of February, 1928.

RICHARD M. KERSCHNER.